Aug. 15, 1933.   D. MALPASS   1,922,251
CONTROL SYSTEM
Filed Oct. 18, 1929
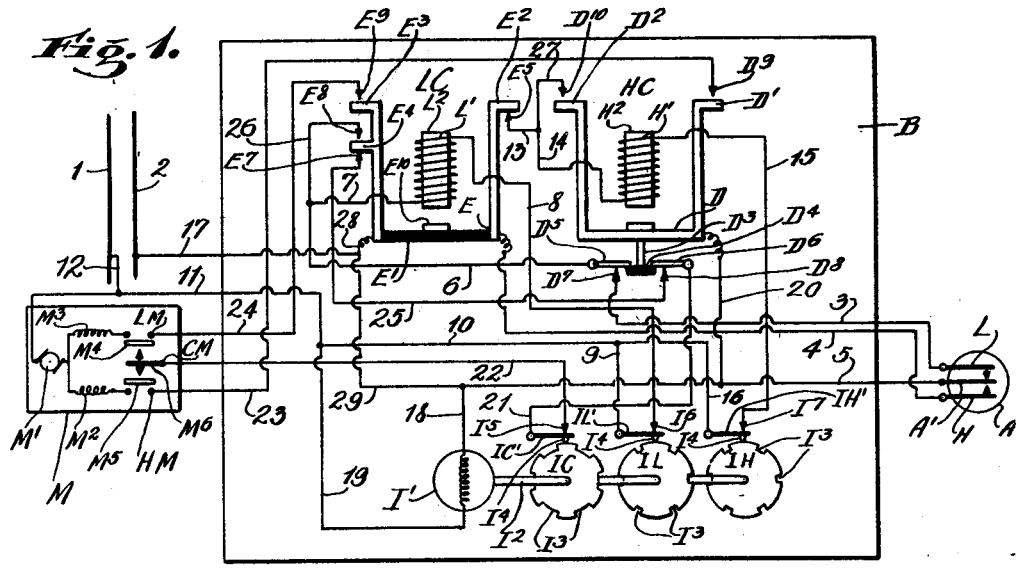
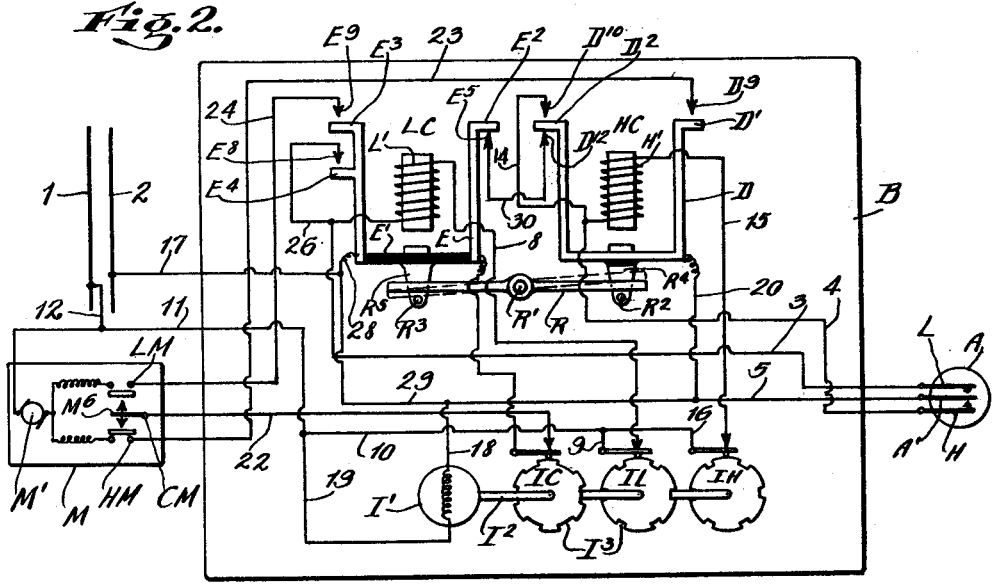
INVENTOR.
DONALD MALPASS
BY
John E. Hubbell
ATTORNEY Patented Aug. 15, 1933

1,922,251

UNITED STATES PATENT OFFICE 1,922,251

CONTROL SYSTEM

Donald Malpass, Philadelphia, Pa., assignor to The Brown Instrument Company, Philadelphia, Pa., a Corporation of Pennsylvania Application October 18, 1929. Serial No. 400,508

11 Claims. (Cl. 236—78)

The present invention relates in general to electrical signaling and controlling apparatus wherein a metering or control instrument having a member moving in response to changes in value of a quantity being measured is electrically connected to an indicating and/or control mechanism which is selectively actuated to perform an indicating or adjusting action corresponding to the value of the quantity measured. The mechanism actuated may be either an indicating mechanism, such as a bank of differently colored incandescent lamps, or a control mechanism having a plurality of adjusting devices or positions, each of which corresponds to a certain value or range of values of the quantity measured, or both indicating and control mechanisms. The indicating or control mechanism is preferably of a type having indicating or control positions corresponding to a desirable normal value of the quantity measured and to values above and below the predetermined normal value. Such mechanisms are known as three position control mechanisms.

The control meter of the system usually comprises three spaced pairs of contact members, each pair forming part of an electric circuit which is energized by the action of the movable meter member on the contact members when the meter member is in a corresponding position. Such instruments are commonly known as three contact metering instruments and when used with one of the three position control mechanisms described, effect a control action by the closing of each circuit contact member.

Metering instruments of a type comprising a pair of adjustable contacts spaced from and at opposite sides of a desirable normal position of the movable member of the instrument have long been in extensive use. When the value of the quantity measured varies from the normal value to an extent that the movable member makes contact with one of the contact members, a corresponding control or indicating action is effected at the control or signaling mechanism connected to the instrument, but as long as the value of the quantity is substantially normal no indicating or control action occurs, irrespective of the previous indicating or control action. Metering instruments of this type are commonly known as two contact instruments.

The general object of my present invention is to provide improvements in electrical signaling and/or controlling apparatus, and particularly in operatively combining a control instrument of the two contact type and a signaling or control mechanism of the three position type, whereby three separate control actions are effected by the two contact control instrument. This combination is rendered operative by the use therewith of an improved relay mechanism, the construction and arrangement of which is a further object of my invention.

The various features of novelty which characterize my invention are pointed out with particularity in the claims annexed to and forming a part of this specification. For a better understanding of the invention, however, and the advantages possessed by it reference should be had to the accompanying drawing and descriptive matter in which I have illustrated and described preferred embodiments of the invention.

Of the drawing:

Fig. 1 is a diagrammatic representation of an embodiment of the present invention; and Fig. 2 is a similar view incorporating a modified form of relay.

In the control system illustrated in Fig. 1, A represents a control meter comprising an index or pointer A' deflecting in response to changes in the value of a quantity measured by the meter, which, for example, may be a control thermometer of the type having a helical spring which opens out on an increase in temperature to which a bulb containing an expansible fluid and connected to the spring is exposed. The temperature measured may be any source of heat, such as a furnace, and the control apparatus utilized to regulate the supply of liquid or gaseous fuel thereto. When the pointer A' mounted on the spring is moved from a neutral position, which corresponds to a desired normal operating temperature, to positions corresponding to predetermined high and low points in the operating temperature range, a contact carried by the pointer makes contact with high and low contact arms H and L, respectively. These contact arms are ordinarily adjustable so that the normal temperature to be maintained may be varied for different operating conditions. The instrument may also be of the type in which the deflecting pointer is periodically depressed and when depressed at high and low temperature points closes pairs of contacts, corresponding in effect to the high and low contacts H and L.

As shown in Fig. 1 the control system also comprises a relay mechanism to which the control meter members A', H and L are electrically connected. The relay, as is diagrammatically illustrated, includes a pair of contactor units LC and HC positioned on an insulating panel B and each contactor has an electromagnet consisting of a coil L' or H' surrounding a core $L^2$ or $H^2$ of magnetic material and adapted to be energized from supply conductors 1 and 2 when the pointer A' makes contact with the corresponding contact arm L or H. A U-shaped contact bar or armature D having contact arms D' and $D^2$ thereon is positioned adjacent the core $H^2$ and arranged to be pulled in towards said core and drop out as the coil H' is energized and deenergized, respectively. The armature D has an extension $D^3$ on the end of which a horizontal bar $D^4$ of insulating material is secured. Pivoted contacts $D^5$ and $D^6$ have their free ends supported on the bar ends in a position in which they normally engage stationary contacts $D^7$ and $D^8$, respectively. These contacts are opened by the movement of the bar $D^4$ when the coil H' is energized. The armature contacts D' and $D^2$ are arranged to engage stationary contacts $D^9$ and $D^{10}$, respectively, in the upper or "in" position of the armature and the contacts are opened in the lower or "out" position.

An armature E is similarly associated with the core $L^2$. The armature E has an insulated base section E' carrying a central block $E^{10}$ of magnetic material. Contact arms $E^2$, $E^3$ and $E^4$ are shown on the armature side portions and arranged to close one or more circuits in the in and out positions of the armature. Contact $E^2$ engages a stationary contact $E^5$ when the armature is out, while contact $E^4$ engages stationary contacts $E^8$ and $E^7$ in the in and out positions, respectively; and contact $E^3$ engages a stationary contact $E^9$ in the in position. The relay contactor units HC and LC are connected to the control meter A by suitable conductors arranged as will hereinafter appear.

The relay also includes an interrupter mechanism which is continuously actuated to periodically break the contactor coil energizing circuits and one of the control circuits. This mechanism consists of a synchronous motor I' for effecting a continuous rotation of an interrupter drum I mounted on a shaft $I^2$. The interrupter drum is constructed of insulating material and divided in effect into three adjacent cylindrical sections IC, IL and IH, as is diagrammatically illustrated. Each of the drum sections has a plurality of depressions $I^3$ arranged transversely on its circumferential surface at uniform points, the depressions being correspondingly spaced in all sections. A series of spring contacts IC', IL' and IH' are positioned adjacent the corresponding drum sections and provided at one side with a projection $I^4$ contacting with the circumferential surface of the drum. Stationary contacts $I^5$, $I^6$ and $I^7$ are positioned adjacent to the spring contacts IC', IL' and IH', respectively, and are normally held in contact therewith by the pressure of the drum on the projections $I^4$.

When during the rotation of the drum a projection $I^4$ passes into one of the depressions $I^3$, its engagement with its stationary contact is broken and the corresponding circuit opened. As shown the depressions $I^3$ in the drum sections IL', IH' have the same arcuate length, while the depressions in the section IC are of slightly greater length, whereby the circuit including the contact IC' will be periodically broken before and remain broken after the momentary breaking of the other circuits affected. The periods during which the interrupter contacts engage the stationary contacts may be varied for various control requirements by changing the length of the drum depressions or the speed of the motor I' or both. The interrupter motor is energized through conductors 18 and 19 from the supply conductors 1 and 2.

When the control system illustrated is used for controlling the rate of combustion of fuel supplied to a furnace, the fuel valve is preferably adjustable into one or another of three operating positions, in one of which the fuel is supplied at a maximum rate, in another of which fuel is supplied at a minimum rate, while in the third fuel is supplied at an intermediate rate.

The fuel valve is operated through a three position control mechanism M by suitable connections from a reversible electric motor M', the direction of rotation of which is controlled through the selective energization of series field windings $M^2$ and $M^3$. One side of the motor is permanently connected to the supply conductor 1 through a conductor 12, while the other side is selectively connected to the supply conductor 2 through the relay mechanism, terminal posts LM, CM, or HM, and field windings $M^2$ or $M^3$. When the winding $M^2$ is energized through the post HM the motor is rotated in a valve closing direction until fuel is supplied at a minimum rate while energization of the winding $M^3$ through the post LM effects a valve opening movement until the valve reaches a position in which fuel is supplied at a maximum rate. When the motor is connected to supply conductor 2 through the neutral post CM, the motor is caused to turn in either direction as required to restore the valve to a position in which fuel is supplied at a predetermined normal rate. The post CM is not connected to either field winding when the valve is in its intermediate position. When, however, the valve is moved to either its maximum or minimum rate positions, a pivoted contact arm $M^6$ is simultaneously moved by the motor to electrically connect the post CM with the deenergized field winding, whereby the motor can be subsequently energized to restore the valve to the intermediate position.

The control mechanism is supplied with a limit switch device indicated at $M^4$ and $M^5$ through which the motor circuit is automatically interrupted when the motor movement has been sufficient to move the valve to the limit of any of its intended movements. For example, if the fuel valve is supplying fuel at its minimum rate and the operating temperature drops until the pointer is in the neutral position, the field winding $M^3$ will be energized through the terminal CM and the valve moved until it is in the intermediate position, at which point the circuit will be automatically interrupted by the limit switch. The specific fuel valve connections and control mechanism described are not novel with me and since they are claimed only in combination with the other elements of my control system, a more specific illustration is deemed unnecessary.

With the foregoing parts arranged as described and electrically connected as will hereinafter appear, the operation may be summarized as follows: Assuming the operating temperature drops below the desired normal value, while the fuel valve is in its intermediate position, sufficiently to cause the pointer to engage the contact arm L, the contactor coil L' will be thereby energized through the conductor 3, contact $D^7$, contact arm $D^5$, conductors 6 and 7, conductor 8, contact $I^6$, spring contact IL', and conductors 9, 10 and 11 to the supply conductor 1. The pointer A' is connected at all times to the supply conductor 2 through conductors 5, 29 and 17. The energizing circuit being thus established, the armature E is pulled in to the core L² to make contact between the contacts E⁴ and E⁸ and between the contacts E³ and E⁹ and to break the contact between the contacts E⁴ and E⁷ and between the contacts E² and E⁵.

The coil L' will remain energized or electrically locked, whether or not the pointer remains in contact with the contact L or whether it engages the contact H, by means of an auxiliary energizing circuit, which becomes effective as soon as the armature is in. The coil will then be connected to conductors 1 and 2 through conductors 12, 11, 10 and 9, spring contact IL', contact I⁶, conductors 8, 7, and 26, contacts E⁸ and E⁴, and conductors 28 and 17.

Energization of the contactor HC during the period in which the contactor LC is energized and vice versa is prevented by the arrangement of each coil main energizing circuit with a portion of its line dependent on the position of the other contactor armature. For example, the contactor HC cannot now be operated because the circuit from the contact H to the coil H' will remain open so long as the contacts E² and E⁵ are separated.

When the contactor LC is thus energized the control circuit of the control motor M' through the terminal LM and winding M³ is established with the supply conductor 2 through the conductors 17 and 28, contacts E³ and E⁹, and conductor 24. The corresponding valve opening control movement of the motor M' then occurs and continues until either the maximum rate of fuel supply is reached, at which point the limit switch opens the control circuit, or the circuit is broken by the interrupter drum causing the spring contact IL' to break with the contact I⁶ and thus deenergize the coil L'. If the pointer has remained or is again in contact with contact L when the motor circuit is opened, the valve will be subjected to another valve opening movement which will continue until either the limit switch or interrupter acts.

Assuming, however, that during the foregoing control movement, the operating temperature has increased to its normal value. Then when the high rate control circuit is next interrupted, the armature drops out, and since the contact arm M⁶ is now connected to the winding M², a valve closing movement of the motor M' will be immediately effected to restore the valve to its intermediate position. This control circuit comprises the conductors 17 and 28, contacts E⁴ and E⁷, conductor 25, contact D⁸, contact arm D⁶, conductor 21, spring contact IC', contact I⁵, conductor 22, terminal CM and field winding M². The motor M' is then rotated until the control valve is restored to its intermediate position or until the circuit is interrupted by the drum I or by the energization of either contactor LC or HC.

If the operating temperature now increases sufficiently for the pointer to make contact with the contact H, the coil of the contactor HC is energized by an energizing circuit comprising conductors 12, 11, 10 and 16, spring arm IH', contact I⁷, conductor 15, coil H', conductors 14 and 13, contacts E⁵ and E², and conductor 4. The resulting movement of the armature D causes the bar D⁴ to raise the contacts D⁵, and D⁶ out of engagement with the contacts D⁷ and D⁸, respectively. This last mentioned action prevents any energization of the contactor LC while the contactor HC is energized since the contacts D⁵ and D⁷ are separated. The coil H' will remain energized irrespective of any pointer movement until the next depression I³ in the drum section IH is reached. The auxiliary energizing circuit of the coil H' comprises conductors 17, 29 and 20, armature D, contacts D² and D¹⁰, conductors 27 and 14, coil H', conductor 15, contact I⁷, spring contact IH', and conductors 16, 10, 11 and 12. A corresponding valve closing control movement of the motor M' is effected through conductors 17, 29 and 20, armature D, contacts D' and D9, conductor 23, post HM and winding M2. The control movement continues as usual until the circuit is broken either by the limit switch or by the interrupter.

In a preferred mode of operation the interrupter motor shaft I² is rotated at approximately one revolution per minute and the depressions in the circumference of the interrupter drum are so arranged that the interrupter contacts are closed for approximately 9½ seconds between interrupting periods of approximately ½ second duration. The intermediate valve position control circuit controlled by the interrupter section IC is arranged to be broken slightly before and to close slightly after the other circuits by increasing the arcuate length of the depressions in the section IC. This arrangement prevents the control motor M' from taking a small restoring movement for every interruption when the contactors LC and HC are both deenergized momentarily due to the operation of the interrupter. The interrupter period for this circuit is preferably of ¾ second duration.

From the foregoing description it will be noted that each contactor is electrically locking, i. e. the corresponding coil will remain energized after a momentary contact at the control meter until the circuit is broken by the interrupter; that both contactors are electrically interlocked i. e. the energizing circuit of each contactor will remain open during the energization period of the other contactor, thereby preventing the simultaneous energization of both units; that if the operating temperature falls below, increases above or remains at normal for an extended period that the control mechanism will perform a series of corresponding control actions until the fuel valve reaches its corresponding position; and that while one control circuit is closed, neither of the others can be simultaneously closed. The described arrangement thus effects the desirable three position control of the temperature by means of a two contact control meter in a simple and highly effective manner.

In Fig. 2 I have diagrammatically illustrated an alternative embodiment of my invention in which the interlocking of the contactors is effected mechanically by a horizontal bar R pivoted on the panel B at R' and having its opposite ends arranged to engage pins R² and R³ mounted on insulated extensions R⁴ and R⁵ of the armatures D and E, respectively. When either contactor is energized, the locking bar will have its opposite end forced outwardly to prevent any inward movement of the other armature. The mode of operation of this form of the invention is fundamentally the same as that of Fig. 1 except for the substitution of the mechanical locking means for the electrical interlocking means of Fig. 1. This construction also eliminates the need of several conductors shown in Fig. 1 and simplifies the construction of the relay armatures by the elimination of the bar D⁴ and its cooperating elements. The only additional elements are the locking bar and a conductor 30 connected to stationary contacts E⁵ and D¹² which are adapted to contact with armature contacts E² and D² when the contactors are deenergized. With this arrangement as in Fig. 1 the normal control circuit will remain open whenever either of the contactors are energized. Where the control system of this invention is employed to operate a bank of signal lamps, which is usually made up of a red, a white, and a green lamp, to indicate high, normal, and low conditions of the value being metered, such lamps would be connected in series in the wires 23, 22 and 24 respectively, of the circuit as shown in Figures 1 and 2. In such case the conductors 23, 22 and 24 would lead directly to the main 1. In operation when the meter A is operated to make a low contact, the relay LC is energized and a circuit closed to light the green lamp through the conductor 24. When the relay LC is de-energized, the green lamp is extinguished, and if the meter index still be in contact with the L contact, the green lamp will again be lighted as the rotation of the cam IL continues. A similar action takes place when the meter index is in contact with the H contact, the red light being illuminated when rotation of the cams IL and IH completes the circuit through the coil of the relay HC. So long as the meter index remains out of contact with either of L or H contacts, relays LC and HC remain deenergized and the white lamp is illuminated intermittently through the switch IC¹.

While in accordance with the provisions of the statutes I have illustrated and described the best forms of embodiment of my invention now known to me, it will be apparent to those skilled in the art that many changes may be made in the actual construction of the apparatus embodying the invention disclosed without departing from the spirit of my invention as set forth in the appended claims and that in some cases certain features of my invention may be used to advantage without a corresponding use of other features.

Having now described my invention what I claim as new and desire to secure by Letters Patent, is

1. In a control system, the combination with a control meter comprising a member deflecting in response to changes in value of a quantity and a pair of spaced contacts selectively actuated by said member according to its deflection from a normal intermediate position, of a three position control mechanism having three control circuits and being selectively actuated into one or another of three control conditions accordingly as one or another of said control circuits is energized, and a relay mechanism electrically connected to said meter member and contacts and to said control circuits and comprising means for selectively energizing said control circuits in accordance with the value of said quantity at the time of energization.

2. In a control system, the combination with a control meter having a member moving in response to changes in value of a quantity and a pair of spaced contacts selectively actuated by said member according to its movement from a predetermined intermediate position, of a control mechanism having three control circuits, and a relay mechanism electrically connected to said meter member and contacts and to said control circuits and comprising means for selectively energizing said control circuits in accordance with the value of said quantity at the time of energization, and means for periodically interrupting each of said control circuits.

3. In a control system, the combination with a control meter comprising a member movable in response to changes in value of a quantity and a pair of contact members selectively engaged by said movable member on predetermined movements of the latter from a predetermined normal position, of a three position control mechanism having three control circuits, the closing of which effect corresponding control actions by said mechanism, and a relay mechanism electrically connected to said meter movable member and contact members and comprising means for closing two of said control circuits when said movable member engages said contact members, and means for automatically closing the third control circuit whenever said movable member is in a position intermediate said contact members and said first mentioned circuits are open and the control action effectible by said third control circuit is required.

4. In a control system, the combination with a control meter comprising a member movable in response to changes in value of a quantity and a pair of stationary contact members adapted to make contact with said movable member on predetermined movements of the latter from a predetermined normal position, of a control mechanism including a plurality of control circuits, the closing of which effect corresponding control actions by said mechanism, and a relay mechanism electrically connected to said meter and control mechanism and comprising a pair of contactor units, each adapted to be energized by said movable member making contact with one of said contact members, means for separately closing two of said control circuits when the corresponding contactor unit is energized, means for separately closing a third control circuit when the said contactor units are deenergized and the control action effectible by said third control circuit is required, means for periodically interrupting all of said control circuits, and means preventing the energization of either contactor unit when the other contactor unit is energized.

5. In a control system, the combination with a control meter comprising a member movable in response to changes in value of a quantity and a pair of stationary contact members adapted to make contacts with said movable member on predetermined movements of the latter from a predetermined normal position, of a control mechanism having a plurality of control circuits, the closing of which effect corresponding control actions by said mechanism, and a relay mechanism electrically connected to said meter and control mechanism and comprising a pair of contactor units, each unit including a coil, an armature pulling in and dropping out as said coil is energized and deenergized, respectively, and means for maintaining said coil energized when the corresponding energizing circuit is opened at said meter, means for separately closing two of said control circuits when the corresponding contactor unit is energized, means for closing a third control circuit when said movable meter member is out of contact with said contact members and the control action effectible by said third control circuit is required, and means for periodically interrupting all of said control circuits.

6. In a control system, the combination with a control meter comprising a member movable in response to changes in value of a quantity and a pair of spaced contact members adapted to make contact with said movable member on predetermined movements of the latter from a normal position, of a control mechanism including three control circuits, the closing of each of which effects a corresponding control action of said mechanism, and a relay mechanism electrically connected to said meter and control mechanism and comprising a pair of contactor units, each unit including a coil, an armature movable toward and away therefrom as said coil is energized and deenergized, respectively, and means rendered operative by a movement of said armature for maintaining said coil energized after the coil energizing circuit is opened at said meter, means separately establishing two of said control circuits when the corresponding contactor unit is energized, means establishing the third control circuit when said movable meter member is out of contact with said contact members and said contactor units are deenergized and the control action effectible by said third control circuit is required, means for periodically interrupting all of said control circuits, means preventing the energization of either contactor coil when the other contactor coil is energized, and means preventing the establishing of said third control circuit when either of said other control circuits are established.

7. An electrical relay mechanism comprising a pair of contactor units, each of said units having an electromagnet and an armature movable toward and away therefrom as said electromagnet is energized and deenergized, respectively, means for energizing said electromagnets, means controlled by the movements of each armature on the energization of the corresponding electromagnet for rendering the other contactor unit ineffective, and means for periodically interrupting both of said energizing circuits.

8. An electrical relay mechanism comprising a pair of contactor units, each of said units having an electromagnet and an armature movable toward and away therefrom as said electromagnet is energized and deenergized, respectively, means for energizing said electromagnets, means for electrically locking said armature in its energized position, means controlled by the movements of each armature on the energization of the corresponding electromagnet for rendering the other contactor unit ineffective, and means for periodically interrupting both of said energizing circuits.

9. An electrical relay mechanism comprising a pair of contactor units, each of said units having an electromagnet and an armature movable toward and away therefrom as said electromagnet is energized and deenergized, respectively, means for energizing said electromagnets, means for electrically locking said armature in its energized position, a bar member actuated by the movement of each armature on the energization of the corresponding electromagnet and arranged to temporarily prevent movement of the armature of said other contactor unit, and means for periodically interrupting said electromagnet energizing circuit.

10. In a control system, the combination with a control meter comprising a member movable in response to changes in value of a quantity and a pair of contact members selectively engaged by said movable member on predetermined movements of the latter from a predetermined normal position, of a relay mechanism electrically connected to said movable member and contact members and comprising a pair of contactor units, each adapted to be energized by said movable member making contact with a corresponding contact member, means for electrically locking each of said contactor units when energized, and means for electrically interlocking said contactor units.

11. In a control system, the combination with a control meter comprising a member movable in response to changes in value of a quantity and a pair of contact members selectively engaged by said movable member on predetermined movements of the latter from a predetermined normal position, of a relay mechanism electrically connected to said movable member and contact members and comprising a pair of contactor units, each adapted to be energized by said movable member making contact with a corresponding contact member, means for electrically locking each of said contactor units when energized, means for electrically interlocking said contactor units, and periodically operating means for interrupting the energizing circuits of both of said contactor units.

DONALD MALPASS.